United States Patent [19]
Golden et al.

[11] 3,755,050
[45] Aug. 28, 1973

[54] REFLECTIVE BICYCLE PEDAL TREAD

[75] Inventors: Gerald Golden, Highland Park; Charles V. Wrobel, Jr., Arlington Heights; Walter Dian, Downers Grove, all of Ill.

[73] Assignee: Excel Incorporated, Franklin Park, Ill.

[22] Filed: May 4, 1971

[21] Appl. No.: 140,148

[52] U.S. Cl. .............. 161/2, 74/563, 74/594.4, 156/73, 156/244, 161/116, 161/149
[51] Int. Cl. ............................................ G05g 1/14
[58] Field of Search .............. 74/560–563, 594.4; 350/97, 103, 307; 156/73, 244; 161/2, 116, 149

[56] References Cited
UNITED STATES PATENTS

| | | | |
|---|---|---|---|
| 3,659,478 | 5/1972 | Pawsat et al. | 74/594.4 |
| 2,592,238 | 4/1952 | Brammer | 350/97 X |
| 3,458,245 | 7/1969 | Stanley | 350/103 X |
| 3,396,214 | 8/1968 | Crandon | 156/73 X |
| 3,508,986 | 4/1970 | Berleyoung et al. | 156/73 |
| 2,151,144 | 3/1939 | Penny et al. | 74/594.4 X |

Primary Examiner—William A. Powell
Attorney—Hill, Sherman, Meroni, Gross & Simpson

[57] ABSTRACT

Reflective type of bicycle pedal tread having an outwardly facing plane surface extending along the pedal tread and an acrylic plastic reflector of the reflex type extending along the surface, and maintained in position on the surface with its reflective surface exposed for the entire length of the reflector. The reflector is sealed by a plastic sealing strip one form of which may be made from an acrylonitrile-butadiene-styrene copolymer, and capable of sealing the reflector and extruded with the pedal tread during extruding of the vinyl pedal tread to be a part of the pedal tread.

2 Claims, 4 Drawing Figures

Patented Aug. 28, 1973                                          3,755,050
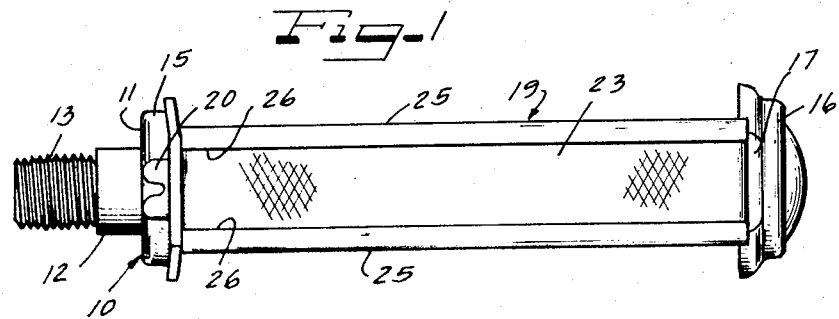
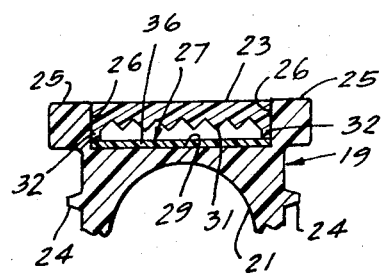 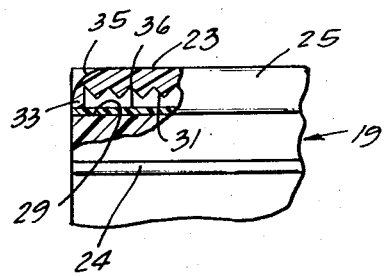
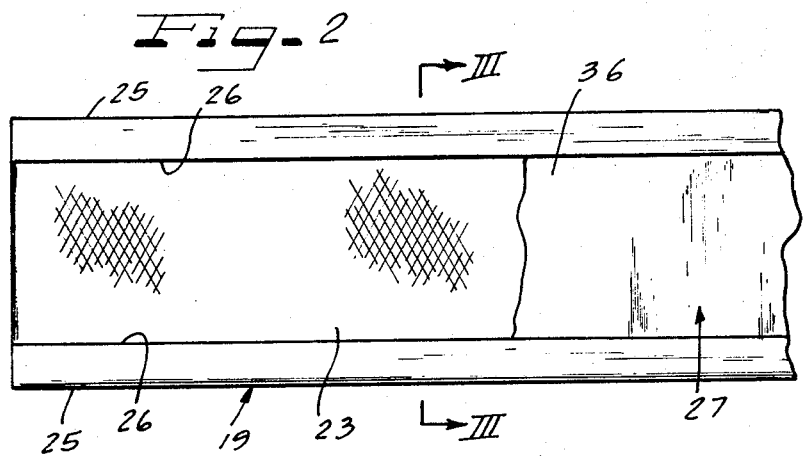
INVENTORS
GERALD GOLDEN
CHARLES V. WROBEL
WALTER DIAN
ATTORNEYS

REFLECTIVE BICYCLE PEDAL TREAD

THE FIELD OF THE INVENTION

Reflective plastic bicycle pedal tread in which the reflector is a reflex reflector made from an acrylic plastic and is sealed and secured to the pedal tread without the use of the conventional rivets.

BACKGROUND OF THE INVENTION AND OBJECTS

In the making of reflector type bicycle pedal treads, the reflector is usually hermetically sealed and then riveted to the pedal tread, since the material from which the reflector is made is not capable of being adhesively secured to the pedal tread, which is usually made of a vinyl material.

Bicycle pedal reflectors are required on all bicycle pedals in California and bicycle manufacturers are complying with standards set by the State of California for all bicycles sold in this country. It is advantageous that the reflector extend for the entire length of the pedal, and have an uninterrupted reflective surface extending for the entire length of the reflector. The reflector is usually sealed and riveted to the pedal tread, with a resultant loss of reflective area of the reflector. The pedal tread has also been formed to retain the reflector to the tread, as for example, by bowing the pedal tread and retaining the reflector in a channel extending along the pedal tread, by restriction of the channel, caused by the bowing, or by mounting the reflector in the support for the pedal tread and retaining the reflector to the support by the pedal tread as in U.S. Pat. application Ser. No. 876,910 filed on Nov. 14, 1969 by Gerald Golden and Charles V. Wrobel, Jr. and assigned to the assignee of the present application and now U.S. Pat. No. 3,657,949, dated Apr. 25, 1972. While the pedal treads and reflectors of U.S. Pat. No. 3,657,949 have been satisfactory and are an advance over the riveting of the reflector to the pedal tread, they are expensive and usually require that the pedal treads be bowed, particularly where the channel in the pedal tread is to retain the reflector to the pedal tread. Also, in such systems, it has not been possible to take full advantage of the reflective area of the reflector for the entire length of the pedal tread.

It has been found that the reflector may be sealed with a plastic material capable of being extruded with the bicycle pedal tread during extruding of the tread, and retaining of the reflector to the pedal tread by the seal between the reflector and plastic material, without the use of the customary rivets or other fastening means.

A suitable material sealing the reflector is an acrylonitrile-butadiene-styrene copolymer which may be sealed to the reflector by sonic sealing, and which is also capable of being extruded together with the pedal tread, making it possible to seal the reflector and retain the reflector to the pedal tread in a single sealing operation.

A principal advantage of the present invention is the improvement of reflector type bicycle pedal treads by sealing the reflector by a plastic sealing material capable of being extruded with the pedal tread, and retaining the reflector to the pedal tread by the seal and thereby providing no interruption in the reflective surface of the reflector.

Another advantage and object of the invention is the improvement in the means for mounting reflectors on bicycle pedal treads, by extruding the seal for the reflector with the pedal tread, and sealing the reflector to the seal by sonically sealing and retaining the reflector to the pedal by the seal, and thereby making it possible for the entire reflective surface of the reflector to be used for reflective purposes for the entire length of the pedal tread.

Another and important object of the invention is to provide an improved form of bicycle pedal, in which reflectors are carried by and mounted on the pedal treads without the use of the conventional rivets, and providing uninterrupted reflective surfaces, capable of reflecting rays of light for the entire length of the reflector.

Other objects, features and advantages of the invention will be readily apparent from the foregoing description of a certain preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a view in side elevation of a bicycle pedal constructed in accordance with the principles of the present invention, showing a reflector secured to the pedal tread in accordance with the principles of the present invention and extending for the length thereof.

FIG. 2 is an enlarged partial fragmentary side view of the pedal tread and reflector shown in FIG. 1, with parts of the reflector and sealing member broken away, to more clearly illustrate the sealing means for the reflector extruded with the vinyl pedal tread.

FIG. 3 is an enlarged transverse sectional view taken substantially along line III—III of FIG. 2; and FIG. 4 is a partial fragmentary detail side view of the pedal tread with certain parts of the reflector, pedal tread and seal shown in section.

DESCRIPTION OF PREFERRED EMBODIMENT OF INVENTION

In the embodiment of the invention illustrated in FIGS. 1 through 4 of the drawings, we have shown a bicycle pedal 10 journalled on a pedal shaft 12 on ball bearings (not shown) in a conventional manner. The pedal shaft 12 has a threaded inner end portion 13 adapted to be threaded on a crank arm of a bicycle sprocket (not shown), for driving the sprocket. Inner and outer cross bars 15 and 16, respectively, are disposed adjacent opposite ends of the hub 11 and extend equal distances in opposite directions from said hub. Pedal tread supports 17 extend from opposite ends of the cross bar 16 through pedal treads 19. Said pedal tread supports extend from the cross bar 16 through the cross bar 15 and are shown in FIG. 1 as being crimped thereto as designated by reference numeral 20. The pedal construction is no part of the present invention, so need not be shown or described in greater detail herein.

Each pedal tread 19 is preferably extruded from a plastic material and has a hollow interior portion 21 through which the pedal tread supports 17 extend, to support said pedal tread in a conventional manner. The pedal treads, however, need not necessarily be hollow, but may be of any form conventionally used on bicycle pedals, and having one outwardly facing face for the mounting of a reflector 23.

The pedal tread 19 is generally rectangular in form and is preferably formed from a vinyl plastic extrusion. Spaced ribs 24, extend along the top and bottom sides of the pedal tread and generally rectangular ribs 25 extend along the corners thereof. The ribs 24 and 25 provide a firm grip for the foot in pedaling the bicycle, as is conventional with bicycle pedal treads. The ribs 25 extending along the corners of the pedal tread have inner walls 26 forming the side walls of a channel 27 having a bottom web or base 29. The channel 27 forms a mounting for the reflector 23, which is shown as extending for the length thereof. It should be understood, however, that the reflector need not extend for the length of the channel, and that the reflector need not necessarily extend along a channel, but may extend along any plane surface of a pedal tread.

The reflector 23 is a conventional form of reflex reflector, made from an acrylic plastic material and having facets 31 extending inwardly therefrom and converging into peaks at their inner ends, to provide a multiplicity of reflective surfaces, in a manner common to acrylic reflectors, so not shown or described in detail herein. Marginal ribs 32 extend along the sides of the reflector beneath the facets 31. Marginal ribs 33 connect the ribs 32 together at opposite ends of the reflector. The bottom surfaces of the ribs terminate in a single plane and thereby provide plane surfaces, enabling ready sealing of the reflective facets of the reflector. Opposite ends of the reflector 23 are rounded as designated by reference numeral 35 in FIG. 4.

As has previously been mentioned, it has not been possible to seal an acrylic plastic prismatic reflector to a vinyl pedal or to seal the reflector and an aluminum seal for the reflector to the pedal. The reflector has formerly been hermetically sealed to prevent clouding of the reflective surfaces of the reflector by dust or foreign particles and to thereby enhance the reflectivity of the reflector. The reflector so sealed has then been riveted in position in its channel with a consequent loss of reflective area of the reflector, particularly adjacent the ends of the reflector, which are more likely to be exposed to rays of light then the central portion of the reflector, which may partially be hidden by the foot.

It has been found that materials other than aluminum foil may be used to seal the reflector, which need not necessarily serve to reflect rays of light, and that plastic materials which may be extruded with the vinyl pedal tread may seal the reflector without affecting the reflectivity of the reflector. Such materials are plastic materials capable of being extruded with vinyl, and of forming a seal for an acrylic reflector by heat or sonic sealing. While there are many such materials a preferred material, which hermetically seals the reflector and positively retains it in position is a plastic material known as A.B.S. An A.B.S. plastic is an acrylonitrile-butadiene-styrene copolymer frequently sold under the trade name "Cycolac." An A.B.S. strip may be extruded with the vinyl pedal tread during extruding of the tread and not only seals the reflector but positively holds the reflector in position on the pedal tread and thereby makes it unnecessary to rivet the reflector to the pedal tread, with a resultant loss in reflective area of the reflector in the area covered by rivets or other securing means.

In FIGS. 2, 3 and 4, we have shown a strip 36 of A.B.S. extruded with the vinyl pedal tread to extend along the bottom 29 of the channel 27, and form a seal for the reflector 23. It has been found that an effective means for sealing the reflector to the strip of A.B.S. is by a conventional form of sonic sealing, which is well-known to those skilled in the art so need not herein be shown or described further.

Since sonic sealing may advantageously seal the reflector to the strip of A.B.S. extruded with the pedal tread to extend along the pedal tread, the sealing and retaining of the reflector to the pedal tread may be in one sealing operation. The strip of A.B.S. shown as extruded with the pedal tread to extend along the base of the channel or other plane surface of the pedal tread during the operation of extruding the pedal tread may have the reflector 23 placed along the pedal tread, with its marginal ribs 32 and 33 in engagement with the strip of A.B.S. and the internal facets 31 of the prisms of the reflector spaced from the strip of A.B.S. The reflector may then be sealed to the strip of A.B.S. by a sonic sealing operation.

This process not only facilitates the sealing and retaining of the reflector to the pedal tread but also reduces the cost of manufacture of the pedal and enables the full reflective area of the reflector to be taken advantage of for the entire length of the reflector. We claim as our invention:

1. In a reflective pedal tread for bicycles and in combination with a bicycle pedal,
    a vinyl pedal tread having a plane outer surface extending the length thereof,
    an elongated acrylic plastic reflector formed to fit along said plane surface,
    said acrylic plastic reflector having a plane external surface, internal prismatic reflective surfaces, and a marginal portion extending inwardly from said prismatic reflective surfaces and extending about said reflector and terminating in a common plane,
    a strip of plastic bonding and sealing material for said reflector in the form of acrylonitrile-butadiene-styrene copolymer extending along said plane surface for the length and width thereof and bonded thereto and being sealed to said plane marginal portion of said reflector to seal and hold said marginal portion of said reflector to the plane surface of the pedal tread,
    and sonic sealing means hermetically sealing said marginal portion of said reflector to said strip of acrylonitrile-butadiene-styrene copolymer positively copolymer said reflector to extend along said strip of acrylonitrile-butadiene-styrene copolymer as a part of the pedal tread and sealing the prismatic reflective surfaces of said reflector, and retaining said reflector to form a part of said pedal tread.

2. The reflective bicycle pedal tread of claim 1,
    wherein the pedal tread has a channel extending for the length thereof,
    wherein the plane surface of the pedal tread is the base of said channel,
    wherein the strip of acrylonitrile-butadiene-styrene copolymer forms an intergal part of said copolymer and wherein the acrylic plastic reflector sealed to said strip of acrylonitrile-butadiene-styrene copolymer is of substantially the width of said channel and extends therealong.

* * * * *

UNITED STATES PATENT OFFICE
CERTIFICATE OF CORRECTION

Patent No. 3,755,050   Dated August 28, 1973

Inventor(s) Gerald Golden, Charles V. Wrobel, Jr. & Walter Dian

It is certified that error appears in the above-identified patent and that said Letters Patent are hereby corrected as shown below:

Column 4, line 51, change "copolymer" to --bonding--.

Column 4, line 62, change "copolymer", second occurrence, to --base--.

Signed and sealed this 23rd day of April 1974.

(SEAL)
Attest:

EDWARD M. FLETCHER, JR.
Attesting Officer

C. MARSHALL DANN
Commissioner of Patents